US008218279B2

(12) United States Patent
Liao et al.

(10) Patent No.: US 8,218,279 B2
(45) Date of Patent: Jul. 10, 2012

(54) ELECTRONIC DEVICE AND METHOD FOR DYNAMIC USB POWER ASSIGNMENT

(75) Inventors: Ming-Yu Liao, Taipei Hsien (TW); Yu-Chu Chou, Taipei Hsien (TW); Hsiao-Chi Cho, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 420 days.

(21) Appl. No.: 12/613,666

(22) Filed: Nov. 6, 2009

(65) Prior Publication Data
US 2011/0018344 A1 Jan. 27, 2011

(30) Foreign Application Priority Data

Jul. 24, 2009 (CN) .......................... 2009 1 0304775

(51) Int. Cl.
*H02H 3/08* (2006.01)
(52) U.S. Cl. ....................................................... 361/93.1
(58) Field of Classification Search .................. 361/93.1; 320/110–134
See application file for complete search history.

(56) References Cited

U.S. PATENT DOCUMENTS
7,124,307 B2 * 10/2006 Sugita et al. .................. 713/300

FOREIGN PATENT DOCUMENTS
CN 1444151 A 9/2003
JP 06098466 * 4/1994
* cited by examiner

*Primary Examiner* — Rexford Barnie
*Assistant Examiner* — Tien Mai
(74) *Attorney, Agent, or Firm* — Altis Law Group, Inc.

(57) ABSTRACT

An electronic device assigns power to USB ports dynamically. A total current detection circuit transmits driving voltage signals to the USB ports, and detects whether a total current provided to the USB ports exceeds a rated total current and output a total current detection signal. A plurality of short-circuit detection circuits detects whether USB devices connected to the corresponding USB ports are shorted and to output a short-circuit detection signal. A plurality of relay circuits switch connection between the USB ports and the power circuit. A USB controller outputs a control signal according to the total current detection signal and the short-circuit detection signal and directs the relay circuits to switch connection between the corresponding USB ports and the power circuit on and off.

12 Claims, 5 Drawing Sheets

ELECTRONIC DEVICE AND METHOD FOR DYNAMIC USB POWER ASSIGNMENT

BACKGROUND

1. Technical Field

The present disclosure relates to an electronic device and method for dynamic universal serial bus (USB) power assignment.

2. Description of Related Art

Typical 4-wire serial universal serial bus (USB) ports comprise two data lines (D+, D−), a power supply line (Vbus) and a ground line (GND). Electronic devices with USB ports are capable of supplying electric power to USB-connected devices (such as hardware) through the power supply line, such that may USB devices operate normally with no requirement for self-contained power sources.

USB port standards dictate a maximum 5V and 500 mA power allowance for each USB port. Thus, when a USB device requires supplied current exceeding 500 mA, another USB port must be connected to acquire extra current synchronously, which is inconvenient.

DETAILED DESCRIPTION

Figure 1:
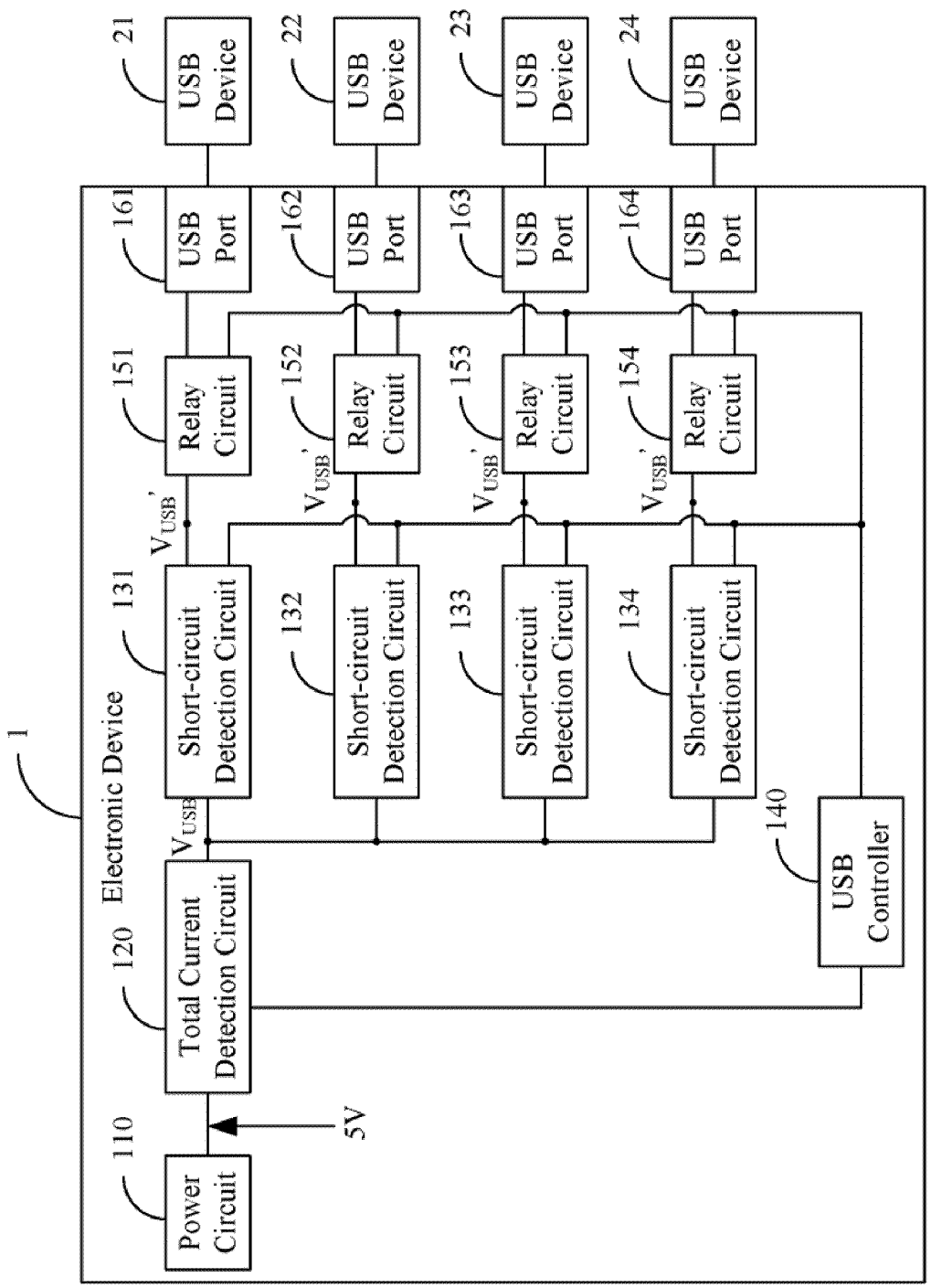
FIG. 1 is a block diagram of an electronic device for dynamic USB power assignment as disclosed.

FIG. 1 is a block diagram of one embodiment of an electronic device 1 for dynamic USB power assignment having no power limits on the USB ports. The electronic device 1 comprises a power circuit 110, a total current detection circuit 120, a plurality of short-circuit detection circuits 131, 132, 133, 134, a USB controller 140, a plurality of relay circuits 151, 152, 153, 154 and a plurality of USB ports 161, 162, 163, 164. The USB ports 161, 162, 163, 164 can be selectively connected to one or more USB devices 21, 22, 23, 24. In the illustrated embodiment, only four USB ports are illustrated, but the disclosure is not limited thereto. Every USB port shown corresponds to one short-circuit detection circuit and one relay circuit.

The power circuit 110 converts external alternating current (AC) signals to driving voltage signals (such as 5V) to drive the USB ports 161, 162, 163, 164 respectively. The total current detection circuit 120 is connected to the power circuit 110, to transmit the driving voltage signals to the USB ports 161, 162, 163, 164, and detect whether a total current provided to the USB ports 161, 162, 163, 164 exceeds a rated total current and output a total current detection signal. The short-circuit detection circuits 131, 132, 133, 134 are connected between the total current detection circuit 120 and corresponding USB ports 161, 162, 163, 164 respectively, to detect whether the USB device 21, 22, 23, 24 connected to the corresponding USB ports 161, 162, 163, 164 are shorted and output a short-circuit detection signal.

The relay circuits 151, 152, 153, 154 are correspondingly connected between the short-circuit detection circuits 131, 132, 133, 134 and the USB ports 161, 162, 163, 164, to switch connection between the USB ports 161, 162, 163, 164 and the power circuit 110 on and off. The USB controller 140 is connected to the total current detection circuit 120, the short-circuit detection circuits 131, 132, 133, 134 and the relay circuits 151, 152, 153, 154, to output a control signal according to the total current detection signal and the short-circuit detection signal and control the relay circuits 151, 152, 153, 154 to switch connection between the corresponding USB ports 161, 162, 163, 164 and the power circuit 110 on and off. In one embodiment, voltage of junctions $V_{USB}$ and $V_{USB}'$ may be approximately 5V.

Figure 2:
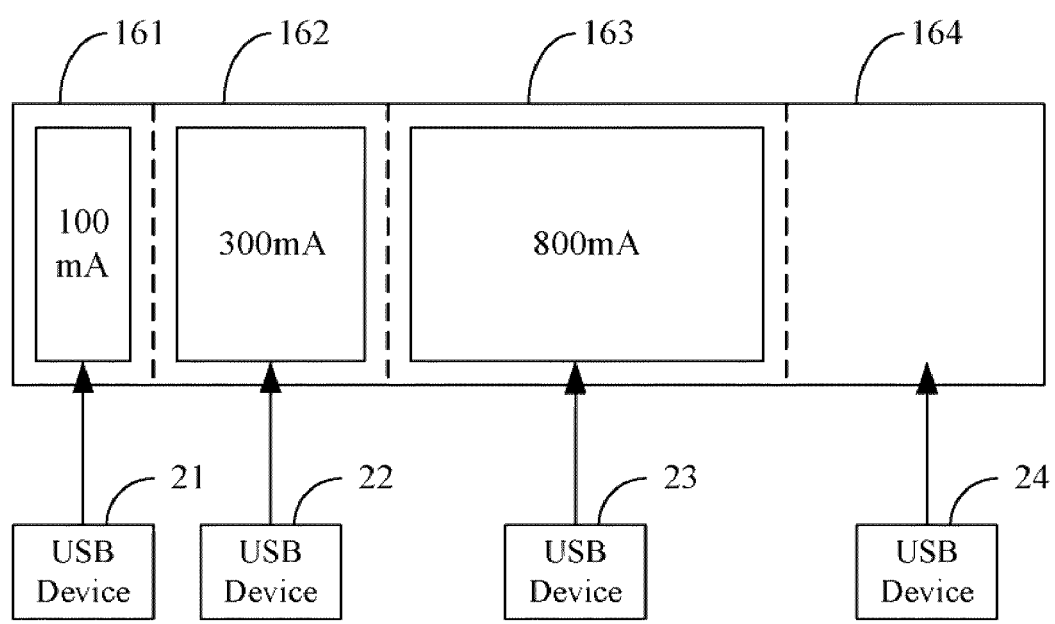
FIG. 2 is schematic diagram of dynamic USB power assignment as implemented by the device of FIG. 1.

Also referring to FIG. 2, dynamic assignment of power to the USB ports 161, 162, 163, 164 is as follows. With maximum current supplied to each USB port 500 mA, the rated total current equals a total current of the USB ports 161, 162, 163, 164, that is, about 2 A. In FIG. 2, the USB devices 21, 22, 23 connected to the USB ports 161, 162, 163 respectively consume about 100 mA, 300 mA, and 800 mA. Obviously, required current of the USB device 23 exceeds the maximum current provided by the USB port 163, so that the USB device 23 is defined as a nonstandard USB device. In common use, the nonstandard USB device 23 would require two or more USB ports to provide power at the same time. It should be understood that the current values described above are exemplary and may differ depending on the embodiment and devices connected to the USB ports 161-164.

However, in the disclosure, when the USB device 23 is connected to the USB port 163, the short-circuit detection circuit 133 corresponding to the USB port 163 detects whether the USB device 23 is shorted. If the USB device 23 is shorted, the short-circuit detection circuit 133 outputs the short-circuit detection signal to the USB controller 140. Thus, the USB controller 140 switches off connection between the USB port 163 and the power circuit 110, and issues a notification to remove the USB device 23. After removal of the USB device 23, the USB controller 140 reboots the USB port 163.

If the USB device 23 is not shorted, the total current detection circuit 120 detects whether the total current provided to the USB ports 161, 162, 163 exceeds the rated total current. If the total current provided to the USB ports 161, 162, 163 exceeds the rated total current, the total current detection circuit 120 outputs the total current detection signal to the USB controller 140. Similarly, the USB controller 140 switches off connection between the USB port 163 and the power circuit 110 and issues a notification to remove the USB device 23. After removal of the USB device 23, the USB controller 140 reboots the USB port 163.

If the total current provided to the USB ports 161, 162, 163 does not exceed the rated total current, the electronic device 1 assigns power to the USB port 163. Thus, the nonstandard USB device 23 requires only one USB port 163 to provide power in the instant invention. Accordingly, the USB port 23 is defined as a nonstandard USB port.

Similarly, when the USB device 24 is connected to the USB port 164, the corresponding short-circuit detection circuit 134 and the total current detection circuit 120 also detects whether the USB device 24 is shorted and the total current provided to the USB ports 161, 162, 163, 164 exceeds the rated total current respectively. In other words, only if the required current of the USB device 24 is less than about 800 mA, can the electronic device 1 assign adequate power to the USB device 24; otherwise, the USB controller 140 switches off connection between a corresponding USB port and the power circuit 110 based on a prearranged standard, for example, switches off the USB port receiving the most recently inserted USB device 24 (USB port 164) or a nonstandard USB port (USB port 163), and issues a notification to remove the USB device 24. After removal of the USB device 24, the USB controller 140 reboots the USB port 163 or 164.

Figure 3:
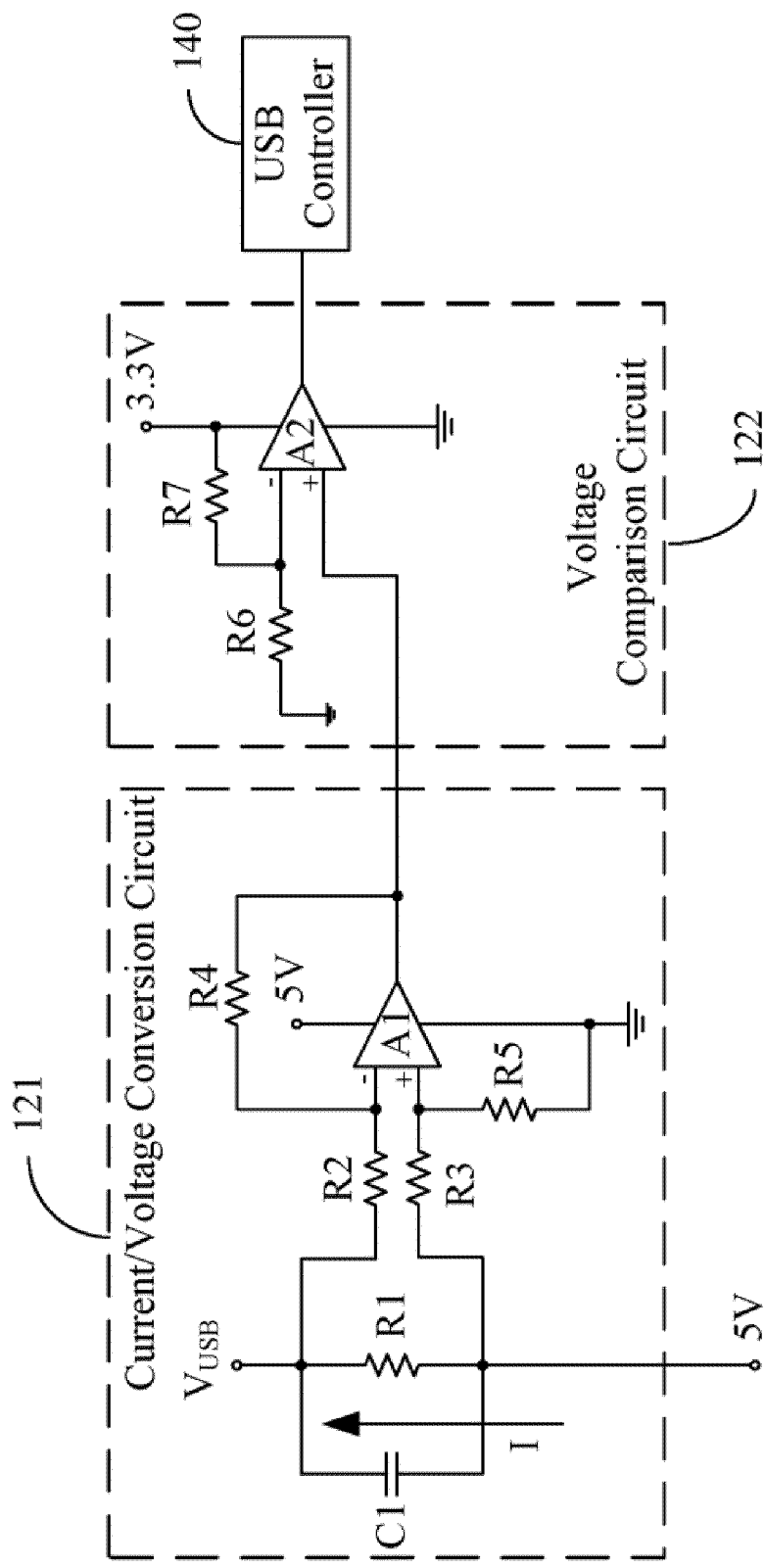
FIG. 3 shows a detail of a total current detection circuit of FIG. 1.

In one embodiment, detailed structure of the short-circuit detection circuits 131, 132, 133, 134 and the total current detection circuit 120 are the same, thus, only the total current detection circuit 120 is illustrated as shown in FIG. 3. The total current detection circuit 120 comprises a current/voltage conversion circuit 121 and a voltage comparison circuit 122. The current/voltage conversion circuit 121, which converts a detected current signal to a voltage signal, comprises a capacitor C1, a plurality of resistors R1, R2, R3, R4, R5 and an amplifier A1.

The resistor R1 and the capacitor C1 are connected in parallel between an input (5V) and an output ($V_{USB}$) of the total current detection circuit 120. The resistor R2 is connected between a negative input of the amplifier A1 and the output of total current detection circuit 120. The resistor R3 is connected between a positive input of the amplifier A1 and the input of total current detection circuit 120. The resistor R4 is connected between an output and the negative input of the amplifier A1. The resistor R5 is connected between the positive input and ground of the amplifier A1. In one embodiment, the resistors R2, R3, R4, R5 and the amplifier A1 form a typical amplification circuit, where an amplification coefficient of which depends on a ratio of the resistors R4 to R2. In addition, amplifier A1 outputs a voltage signal representing the detected current signal.

The voltage comparison circuit 122 determines whether the voltage signal exceeds a predetermined voltage and outputs a comparison signal to the USB controller 140, which comprises two resistors R6, R7 and a comparator A2. A positive input of the comparator A2 is connected to the output of the amplifier A1, a negative input thereof is connected to ground via the resistor R6 and being defined as a reference voltage input, and output thereof is connected to the USB controller 140 to output the comparison signal. The resistor R7 is connected between an external power (3.3V) and the negative input of the comparator A2. In one embodiment, the resistors R6, R7 form a voltage dividing circuit to divide a voltage of the external power, thus, the divided voltage of the resistor R6 is defined as a reference voltage of the comparator A2, that is, about 0.8V.

In one embodiment, when the USB devices are connected to the corresponding USB ports, an inrush current is generated due to a load capacitance of the USB devices. If the inrush current is not limited, the total current detection circuit 120 and the short-circuit detection circuits 131, 132, 133, 134 can malfunction. Therefore, the capacitor C1 connected to the resistor R1 in parallel limits the inrush current. Additionally, voltage output from the total current detection circuit 120 is also approximately 5V, thus, resistance of the resistor R1 is relatively small, such as: 0.1Ω. Function of the total current detection circuit 120 is as follows.

When a USB device is connected to a corresponding USB port, the capacitor C1 shorts instantaneously, thus, the driving voltage signal (5V) charges the capacitor C1 and no current flows through the resistor R1. Accordingly, the current/voltage conversion circuit 121 has no output. Therefore, the total current detection circuit 120 avoids the inrush current. Similarly, the short-circuit detection circuits 131, 132, 133, 134 are not operable. A charging time of the capacitor C1 can be adjusted to match the time of the inrush current, so that when the electronic device 1 functions normally, the capacitor C1 is charged in a saturation state, allowing current through the resistor R1.

If the total current flowing through the USB ports 161, 162, 163, 164 does not exceed the rated total current, the current flowing through the resistor R1 is relatively small, as is voltage added onto the resistor R1. The current flowing through the resistor R1 is converted to a voltage signal via the amplifier A1 and output to the voltage comparison circuit 122. In one embodiment, the amplification coefficient of the amplifier A1 is about 0.4.

In the voltage comparison circuit 122, the voltage signal output from the amplifier A1 received by the positive input of the comparator A2 is less than the reference voltage, so that the comparator A2 outputs a logic low level total current detection signal, such as about 0V, to the USB controller 140. Accordingly, the USB controller 140 controls assignment of power to the corresponding USB port by the electronic device 1.

If the total current flowing through the USB ports 161, 162, 163, 164 exceeds the rated total current, the current flowing through the resistor R1 is relatively large, as is voltage added thereto.

In the voltage comparison circuit 122, the voltage signal output from the amplifier A1 received by the positive input of the comparator A2 exceeds the reference voltage, and the comparator A2 outputs a logic high level total current detection signal, such as 3.3V, to the USB controller 140. Accordingly, the USB controller 140 directs the electronic device 1 to disconnect the corresponding USB port and the power circuit 110.

In one embodiment, detailed structure of the short-circuit detection circuits 131, 132, 133, 134 and the total current detection circuit 120 are substantially the same, except that the dividing voltage 5V is changed to the junction $V_{USB}$, and the junction $V_{USB}$ is changed to the junction $V_{USB}'$ in the current/voltage conversion circuit 121.

Figure 4:
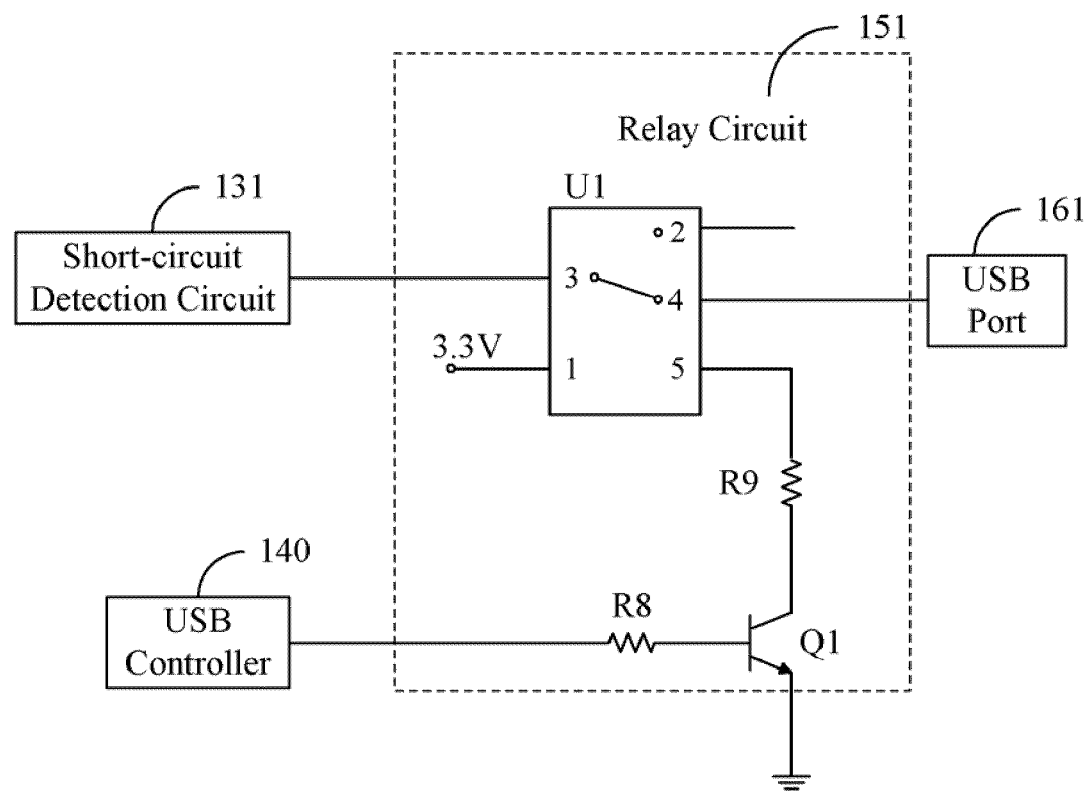
FIG. 4 shows a detail of a relay circuit of FIG. 1.

The relay circuits 151, 152, 153, 154 have the same structure, thus only the relay circuit 151 is shown in FIG. 4. The relay circuit 151 comprises two resistors R8, R9, a transistor Q1 and a chip U1. The transistor Q1 is a n-type transistor. A base of the transistor Q1 is connected to the USB controller 140 via the resistor R8 and an emitter thereof is grounded. In one embodiment, the chip U1 comprises a first pin 1 to receive an external signal, a second pin 2 floated, a third pin 3 connected to the short-circuit detection circuit 131, a fourth pin 4 connected to the USB port 161, and a fifth pin connected to a collector of the transistor Q1 via the resistor R9, switching connection between the USB port 161 and the power circuit 110 on and off.

In a normal state (the total current detection signal and the short-circuit detection signal are normal), the third pin 3 is connected to the fourth pin 4 of the chip U1. In other words, the short-circuit detection circuit 131 is connected to the USB port 161, and the electronic device 1 assigns the power to the USB port 161.

When the total current detection signal and the short-circuit detection signal are abnormal, the USB controller 140 outputs the disable signal, such as a logic high level, to the transistor Q1. Thus, the transistor Q1 is on, and amplifies the disable signal and then outputs to the fifth pin 5 of the chip U1. Accordingly, coiling (not shown) connected between the first pin 1 and the fifth pin 5 generates a magnetic force to connect the third pin 3 to the second pin 2, thus, the relay circuit 151 switches off connection between the USB port 161 and the power circuit 110. In one embodiment, the relay circuit 151 is activated by the logic high level, and in alternative embodiments, can be activated by a logic low level.

Figure 5:
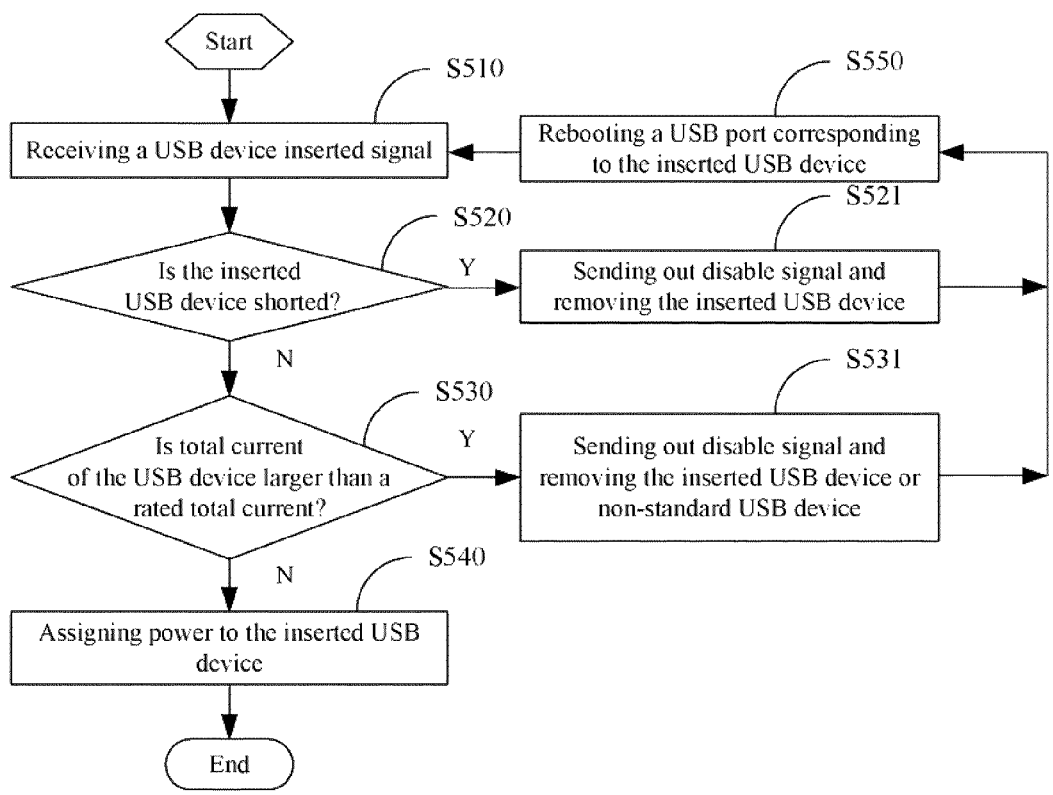
FIG. 5 is a flowchart of a method for dynamic USB power assignment as disclosed.

FIG. 5 is a flowchart of a method for dynamic USB power assignment. In step S510, USB controller 140 receives a USB device insertion confirmation when the USB device is connected to one USB port. In step S520, the USB controller 140 determines whether the inserted USB device is shorted. If the USB device is shorted, step S521 is implemented, in which the USB controller 140 outputs a disable signal and issues a notification to remove the inserted USB device. Then, in step S550, the USB controller 140 reboots the USB port receiving the USB device. If the inserted USB device is not shorted, in step S530, the USB controller 140 continuously determines whether a total current flowing through all the USB ports exceeds a rated total current.

If the total current exceeds the rated total current, step S531 is implemented, in which the USB controller 140 outputs the disable signal, and issues a notification to remove a corresponding USB device according to a prearranged standard, for example, switches off the USB port most recently receiving insertion of a USB device or the nonstandard USB port. Similarly, step S550 is implemented after step S531.

If the total current does not exceed the rated total current, in step S540, the USB controller 140 directs the electronic device 1 to assign power to the inserted USB device.

In the embodiment, an electronic device utilizes a total current detection circuit and a plurality of short-circuit detection circuits to detect whether a total current flowing through the USB ports exceeds a rated total current and detect whether every USB device connected to a corresponding USB port is respectively shorted. Then, relay circuits are directed to switch connections between the corresponding USB ports and the power circuit 110 on and off. Thus, power is assigned to the USB ports dynamically.

Although the features and elements of the present disclosure are described in various inventive embodiments in particular combinations, each feature or element can be configured alone or in various within the principles of the present disclosure to the full extent indicated by the broad general meaning of the terms in which the appended claims are expressed.

What is claimed is:

1. An electronic device for dynamic USB power assignment, comprising:
   a power circuit to convert external alternating current (AC) signals to driving voltage signals;
   a total current detection circuit to transmit the driving voltage signals to USB ports of the electronic device, and to detect whether a total current provided to the USB ports exceeds a rated total current, and output a total current detection signal if the total current exceeds the rated total current;
   a plurality of short-circuit detection circuits connected between the total current detection circuit and the plurality of USB ports respectively, to detect whether one or more USB devices connected to the corresponding USB ports are shorted and to output a short-circuit detection signal if the USB devices are shorted;
   a plurality of relay circuits correspondingly connected between the short-circuit detection circuits and the USB ports, to switch the connection between the USB ports and the power circuit on and off; and
   a USB controller connected to the total current detection circuit, the short-circuit detection circuits and the relay circuits, to output a control signal according to the total current detection signal and the short-circuit detection signal so as to control the relay circuits to switch the connection between the USB ports and the power circuit on and off.

2. The electronic device as claimed in claim 1, wherein the total detection circuit comprises:
   a current/voltage conversion circuit to convert a detected current signal to a voltage signal; and
   a voltage comparison circuit to determine whether the voltage signal exceed a predetermined voltage and output a comparison signal to the USB controller.

3. The electronic device as claimed in claim 2, wherein the current/voltage conversion circuit comprises:
   a capacitor;
   a first resistor connected between an input and an output of the total current detection circuit in parallel with the capacitor, to detect the current signal; and
   an amplifier to output the voltage signal, the amplifier comprising a negative input connected to the input of the total current detection circuit, and a positive input connected to the output of the total current detection circuit.

4. The electronic device as claimed in claim 3, wherein the voltage comparison circuit comprises:
   a comparator having a positive input connected to the output of the amplifier, a negative input received a reference voltage, and an output connected to the USB controller to output the comparison signal;
   a second resistor connected between the negative input of the comparator and ground; and
   a third resistor connected between the negative input of the comparator and an external power source, to form a voltage dividing circuit with the second resistor.

5. The electronic device as claimed in claim 1, wherein each of the short-circuit detection circuits comprises:
   a current/voltage conversion circuit to convert a detected current signal to a voltage signal; and
   a voltage comparison circuit to determine whether the voltage signal exceeds a predetermined voltage and output a comparison signal to the USB controller.

6. The electronic device as claimed in claim 5, wherein the current/voltage conversion circuit comprises:
   a capacitor;
   a first resistor connected between an input and an output of the corresponding short-circuit detection circuit in parallel with the capacitor, to detect the current signal; and
   an amplifier to output the voltage signal, the amplifier comprising a negative input connected to the input of the corresponding short-circuit detection circuit, and a positive input connected to the output of the corresponding short-circuit detection circuit.

7. The electronic device as claimed in claim 6, wherein the voltage comparison circuit comprises:
   a comparator having a positive input connected to the output of the amplifier, a negative input received a reference voltage, and an output connected to the USB controller to output the comparison signal;
   a second resistor connected between the negative input of the comparator and ground; and
   a third resistor connected between the negative input of the comparator and an external power source, to form a voltage dividing circuit with the second resistor.

8. The electronic device as claimed in claim 1, wherein each of the relay circuits comprises:
   a transistor comprising a base connected to the USB controller, an emitter connected to ground, to amplify the control signal; and
   a chip comprising a first pin to receive a signal, a second pin floated, a third pin connected to the corresponding short-circuit detection circuit, a fourth pin connected to the corresponding USB port, and a fifth pin connected to a collector of the transistor, to switch connection between the corresponding USB ports and the power circuit on and off.

9. A method for dynamic USB power assignment, comprising:
    receiving a USB device insertion confirmation when the USB device is connected to a corresponding USB port of an electronic device;
    determining whether the inserted USB device is shorted;
    determining whether a total current flowing through the USB ports exceeds a rated total current, if the inserted USB device is not shorted; and
    assigning power to the corresponding USB port, if the total current does not exceed the rated total current.

10. The method as claimed in claim 9, further comprising issuing a disable signal and a notification to remove the inserted USB device, if the inserted USB device is shorted.

11. The method as claimed in claim 9, further comprising issuing a disable signal and notification to remove the corresponding USB device, if the total current flowing through the USB ports exceeds the rated total current.

12. The method as claimed in claim 9, further comprising rebooting the corresponding USB port.

\* \* \* \* \*